No. 729,733. PATENTED JUNE 2, 1903.
J. CAREY.
MEAT PRESS.
APPLICATION FILED MAR. 5, 1903.
NO MODEL.
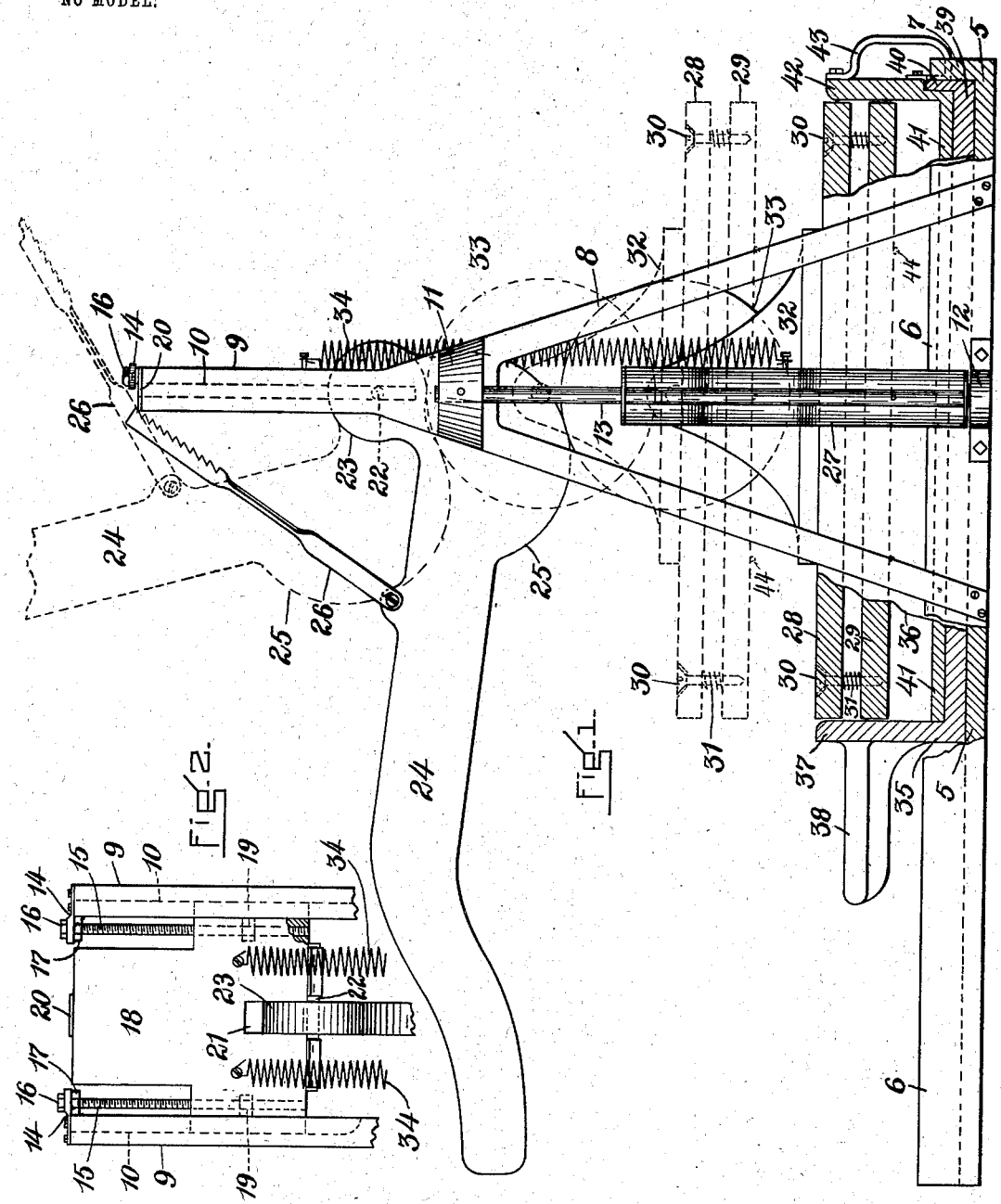
WITNESSES
Fred. E Dorr.
N. G. Kimball.
INVENTOR
John Carey
his Henry J. Miller
atty.

No. 729,733. Patented June 2, 1903.

UNITED STATES PATENT OFFICE.

JOHN CAREY, OF BROCKTON, MASSACHUSETTS.

MEAT-PRESS.

SPECIFICATION forming part of Letters Patent No. 729,733, dated June 2, 1903.

Application filed March 5, 1903. Serial No. 146,368. (No model.)

*To all whom it may concern:*

Be it known that I, JOHN CAREY, of Brockton, in the county of Plymouth and State of Massachusetts, have invented certain new and useful Improvements in Meat-Presses; and I hereby declare that the following is a full, clear, and exact description of the same, reference being had to the accompanying drawings, forming part of this specification.
The present invention relates to improvements in meat-pressers whereby meat may be pressed and consolidated.

The object of the invention is to so construct a meat-press that comparatively great pressure may be quickly exerted on the meat to press the same into a mold.

Another object of the invention is to improve the pressure-exerting means.

Another object of the invention is to improve the construction of the presser block or frame.

Another object of the invention is to so construct the meat tray or mold that the pressed meat can be readily removed therefrom.
The invention consists in the peculiar construction of the pressure-exerting mechanism combined with the pressure-block.

The invention also consists in the peculiar construction of the meat tray or mold.
The invention also consists in such other novel features of construction and combination of parts, as shall hereinafter be more fully described, and pointed out in the claims.

In the drawings, Figure 1 represents a side elevation of the improved meat-press, partially in section, the pressure-exerting devices being shown in full lines in position for pressing and their positions when retracted being indicated in dotted lines. Fig. 2 represents an end view of portions of the machine, showing the means whereby the presser-lever-carrying mechanism may be adjusted.

Similar numbers of reference designate corresponding parts throughout.
In carrying this invention into practice my main object has been to produce a meat-press wherein meat, whether raw or cooked, in a single piece or minced can be expeditiously pressed into shape for display and sale, and that the pressed meat can be readily removed from the press to retain its molded form.

As illustrated in the drawings, in its preferred form the machine comprises a base 5, having side ledges, as 6, and the upturned end 7. On this base 5 is mounted side frames, as 8, extending upward, the members 9 9 of which are furnished with grooves 10 10 at their inner surfaces. On the outer portions of these frames 8 are secured the brackets, as 11, similar brackets 12 being secured to the base 5 and guide-rods, as 13, being secured in the brackets On the upper ends of the frame members 9 9 are secured the plates 14 14, in which the screws 15 15 are free to rotate under the action of a suitable tool adapted to fit the enlargements 16 16 of the screws, and upward movement of the screws being prevented by the collars 17 17, secured to said screws and working against the plates 14 14. In the grooves 10 10 of the members 9 9 is movably mounted the block 18, having vertical perforations, through which the screws 15 15 extend, and recesses in which are located the nuts 19 19, threaded to receive the threads of said screws, the upper portion of the block 18 being contracted in width to provide for clearance of the plates 14 14, and this contracted portion being provided with the latch-plate 20, the lower portion of this block having the opening 21.

To the lower portion of the block 18 is secured the shaft 22, on which is journaled the member 23 of the pressure-lever 24, this lever being furnished with the cam 25, the curve of which is eccentrically disposed in relation to the shaft 22. On the lever 24 is pivoted the ratchet-arm 26, having teeth adapted to engage the latch-plate 20 as the free end of the lever is pressed downward and to hold said lever against upward movement.

On the rods, as 13, are mounted the slides, as 27, and on these slides is mounted the presser-block, which comprises the plate 28 and the plate 29, yieldingly mounted on the plate 28 by means of the screws 30 30, working through perforations in the plate 28 and secured in the plate 29, springs 31 31 being mounted on said screws between the plates to exert a yielding pressure on the plate 29. On the plate 28 is secured a bearing 32, in which the circular disk 33 is journaled, and to the slides 27 and the block 18 are secured the retraction-springs 34 34, which tend constantly to draw upward the slides 27 and the presser-block mounted therebetween.

The meat tray or mold preferably comprises an oblong box 35, having sides 36 36 and the end 37, furnished with the handle 38, the bottom 39 having at the end farthest from the end 37 an upturned lip 40, and this end of the box 35 being open above this lip. Within the box is positioned the false bottom 41, having the end 42, furnished with a handle 43, this false bottom having no sides to obstruct the removal of the pressed meat therefrom when the bottom is removed from its box or tray. The tray is preferably proportioned to receive a certain weight of meat and the press-block is furnished with lips 44 44, adapted to press into the surface of the molded meat, and to thus indicate fractional portions of the whole.

The bottom 41 being placed within the box 35, a suitable quantity of meat is placed on said bottom. The box 35 is then moved along the base 5 until the lid 40 is brought against the portion 7 of said base, the box 35 being then positioned to receive the presser-block. The lever 24 is now pressed down, and its cam 25 bearing on the periphery of the disk 33 will force the same downward against the action of the springs 34 34. The slides 27 will also move downward with the bearing of this disk 33 and the press-block, the plate 29 of this block pressing the meat into the box 35 and causing the consolidation of the fibers of the meat or of the separate portions of meat held in the tray. The ratchet-arm 26 will move into engagement with the latch-plate 20 and will prevent the upward movement of the arm until released, thus holding the meat positively under pressure.

By releasing the screws 30 30 the plates 28 and 29 may be separated for purposes of cleaning or otherwise.

The extension of the slides 27 above and below the pressure-block brings a long leverage to bear against the tipping of this block in any direction, while the simple movement of the lever brings great pressure on the meat through the cam 25 and the disk 33.

The vertical adjustment of the block 18 is desirable to accommodate the machine to trays or molds of various heights or to the height of material therein.

Having thus described my invention, I claim as new and desire to secure by Letters Patent—

1. In a meat-press, a mold, or tray, having an open end furnished with an upwardly-extending lip, and a false bottom having an upward extension to close the open end of the mold.

2. The combination with the base 5, the side frames mounted thereon, the guides 13 mounted in the brackets 11 and 12, the slides 27 movable on said guides, the press-block mounted between said slides and provided with the bearing 32, and the disk 33 journaled in said bearing, of the block 18 mounted at the upper portion of the frames, the springs 34 34 secured to said block and to the slides 27, and the lever 24, pivotally supported by said block 18 and having the cam 25, as and for the purpose described.

3. The combination with the box 35 having the sides 36, the end 37, and the bottom 39 having the lip 40, of the removable end 42 adapted to be engaged by said lip 40 and having the false bottom 41, as described.

4. In a meat-press the combination with a suitable pressure device, of a press-block comprising the slides 27, the plate 28 mounted between said slides and provided with the bearing 32, the disk 33 journaled in said bearing, the plate 29 yieldingly secured to the plate 28 by means of the screws 30 30 furnished with springs 31 31, and guides on which the slides 27 are movably mounted.

In testimony whereof I affix my signature in presence of two witnesses.

JOHN CAREY.

Witnesses:
   A. E. DENISON,
   H. J. MILLER.